United States Patent [19]

Zuk

[11] 4,175,277

[45] Nov. 20, 1979

[54] VOLTAGE SURGE PROTECTOR

[75] Inventor: Paul Zuk, Allentown, Pa.

[73] Assignee: Bell Telephone Laboratories, Incorporated, Murray Hill, N.J.

[21] Appl. No.: 739,470

[22] Filed: Nov. 8, 1976

[51] Int. Cl.[2] .......... H02H 3/22

[52] U.S. Cl. .......... 361/120; 361/124; 361/119; 313/214

[58] Field of Search .......... 361/120, 117, 118, 119, 361/124; 313/214, 311, 244, 252

[56] References Cited

U.S. PATENT DOCUMENTS

| | | | |
|---|---|---|---|
| 3,454,811 | 7/1969 | Scudner, Jr. | 361/120 X |
| 3,649,874 | 3/1972 | Peche | 361/120 |
| 3,789,256 | 1/1974 | Osmundsen | 313/313 |
| 3,791,711 | 2/1974 | Jonassen | 361/120 X |

*Primary Examiner*—Patrick R. Salce
*Attorney, Agent, or Firm*—Allen N. Friedman

[57] ABSTRACT

Electrical equipment, such as telephone station apparatus, exposed to occasional, destructively high, voltage surges (e.g., lightning strikes), is protected by a device placed in parallel with the equipment, including two metal electrodes and an insulating housing. The electrodes define a fixed narrow spark gap which breaks down (arcs over) to short the voltage surge to ground. The width of the spark gap is critical, since it determines the protective breakdown voltage. In the disclosed devices the gap is closely defined although tolerances on the piece parts from which the device is made may be loose. At least one electrode consists of a flanged support member soldered to an electrode cap. The piece parts are assembled with the electrode faces in contact and raised to the soldering temperature. The gap forms as the temperature is reduced from the liquidus temperature of the soldering alloy to ambient temperature because of differential contraction between the insulator material and the metal parts.

5 Claims, 3 Drawing Figures

VOLTAGE SURGE PROTECTOR

BACKGROUND OF THE INVENTION

1. Field of the Invention

The invention is in the field of voltage surge protection devices such as are used to protect telephone station apparatus from external voltage surges (e.g., lightning strikes and induction or accidental contact between telephone lines and power lines).

2. Description of the Prior Art

In transmission systems with large stretches of outdoor wiring, it is common to protect terminal equipment from voltage surges (e.g., lightning strikes) by the inclusion of a protective device between the line and ground at each terminal. Such devices should be capable of sustaining repeated voltage surges without failing, but when they fail, they should fail to an electrically short circuit condition in order to safeguard the terminal equipment. A widely used class of surge protective devices includes two carbon block electrodes with parallel faces defining an air gap of the order of 50 micrometers. This is an extremely inexpensive device, however, the labor cost of replacing failed devices in the field is high. Thus, efforts have been made to extend the service life of such devices.

One such modification, sometimes known as the "gas tube" protector, consists of metal electrodes hermetically sealed in an inert gas atmosphere. Such devices typically include a carbon coating on the electrodes which tends, among other things, to increase the electron emissivity of the surface, thus facilitating the formation of the plasma discharge. One form of such a device utilizes a relatively wide gap (e.g., 500 micrometers) between parallel faces and reduced gas pressure, in order to maintain approximately the same breakdown voltage as the air gap device (U.S. Pat. No. 3,454,811 issued July 8, 1969). This wider gap spacing increases service life, since the chance of shorting failure across the wider gap is greatly reduced. However, when the hermetic seal on such a device fails, the breakdown voltage increases to far above the safe limit. This is known as a "fail open" condition and represents a finite hazard to the terminal equipment and the user. In another group of such devices the inert gas pressure is maintained at approximately atmospheric pressure. However, this requires the use of a narrow gap (e.g., 25-75 micrometers) for a breakdown voltage within the desired safe range. This device represents an improvement over the narrow gap carbon block device because of the materials used and the inert atmosphere. It also maintains the fail-safe feature of the carbon block device, in that seal failure does not increase breakdown voltage above the acceptable level. Hence the dominant failure mode of this device is still shorting across the gap due to electrode damage.

In this device the gap width is critical since it determines the protective breakdown voltage. Fabrication of such a device typically requires close tolerance piece parts in order to maintain the gap width within the required close tolerance.

SUMMARY OF THE INVENTION

In accordance with the invention a metal electrode surge protector with closely defined gap width is fabricated from piece parts whose manufacturing tolerances may be an order of magnitude or more greater than the required gap tolerance. Since the maintenance of tolerances contributes significantly to the cost of manufacture, the inventive structure and fabrication technique should have a significant economic impact on the cost of such devices.

The surge protectors of the invention basically consist of two metal electrodes soldered to either end of an insulating housing. At least one of the electrodes consists of two telescoping metal elements, which are used to compensate for the loose tolerance of the piece parts. The surge protector is assembled with the two electrodes in contact with one another. The assembly is placed in a soldering oven and raised to the temperature in which the soldering alloy is liquid, then cooled to ambient temperature. When the soldering alloy solidifies the two telescoping parts of the electrode become fixed with respect to one another. As the temperature is further reduced the required arcing gap opens up because of differential contraction between the metal electrodes and the insulating housing (i.e., the metal electrodes contract more than the insulator). At ambient temperature the device has a gap width depending, to first order, only on the gross dimensions of a piece parts and on the coefficient of linear expansion of the materials used. Using this technique it is possible, for example, to produce a device with a gap of $75\pm10$ micrometers using piece parts whose dimensions are permitted to have a manufacturing tolerance of $\pm100$ micrometers.

DETAILED DESCRIPTION

Figure 1:
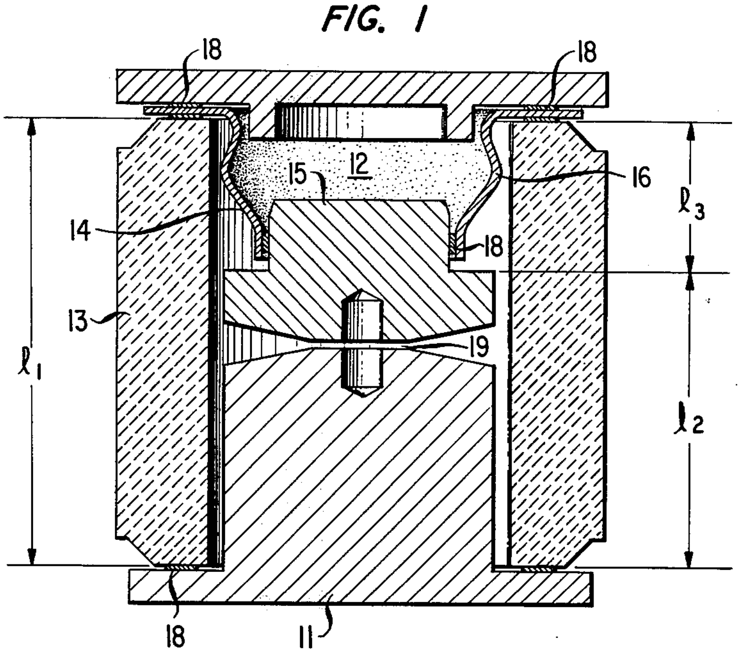
FIG. 1 is an elevational view in section of an exemplary surge protective device with one telescoping electrode.

Much communication terminal equipment (e.g., telephones and telephone switching apparatus) is protected from extraordinary voltage surges by means of protective devices known as "surge protectors" or "lightning arrestors." The essential function of such devices is provided by two electrodes whose broad faces define a predetermined narrow gap. This device, connected between the incoming transmission line and ground, presents an open circuit at the normal operating voltages present in the communications system. During extraordinary voltage surges, caused perhaps by lightning strikes or accidental power line contact, a gas discharge forms in the gap and provides a short circuit path to ground for the damaging voltage surge energy. A gap spacing of 25 to 75 micrometers results in a breakdown voltage of the order of 750 volts in air at atmospheric pressure. In normal operation, this device returns to its open circuit condition after the passing of the voltage surge and it must be capable of sustaining repeated voltage surges without failure.

In this type of surge protective device the width of the protective gap is critical since it determines the magnitude of the breakdown voltage. In typical prior art devices at least some of the piece parts must be fabricated to the same close tolerance as is required of the gap in order to produce the required closely defined gap spacing. Such close tolerance fabrication contributes significantly to the cost of the finished device. In the herein disclosed device, none of the piece parts need be fabricated to as close a dimensional tolerance as is required of the gap. As is illustrated in the exemplary device of FIG. 1, the inventive surge protector consists of two electrodes 11, 12 bonded to either end of an insulating housing 13. At least one of the electrodes 12 includes two telescoping piece parts, a metal flanged support member 14, and a metal electrode cap 15. The height of the support member is designed to leave sufficient clearance 16 to compensate for the tolerances in the height of all of the piece parts plus the design gap width. In this exemplary construction, the flanged support member 14 is provided with shoulders 16 in order to align the electrode 12 within the housing 13. In this exemplary electrode 12, the flanged support member is fabricated from sheet stock and is describable as a flanged sleeve.

In this surge protector the piece parts are sealed to one another through the use of fusible metal 18 where the piece parts come in contact with one another. The fusible metal may be applied by any one of a number of techniques known in the art, for example, the placement of metal rings at the joints to be bonded. The term soldering includes any process of bonding through the use of a solidifying liquid metal (e.g., brazing), particularly at the internal joint between the support member 14 and the electrode cap 15. The external joints may, for example, be welded.

For final fabrication the piece parts are assembled within the electrodes 11, 12 touching one another where the gap 19 will ultimately be formed. For automated production it is desirable that the telescoping piece parts of the two piece electrode 12 have a loose sliding fit (e.g., approximately 50 micrometers clearance) and that the assembly be placed in the soldering oven vertically, as shown in FIG. 1, with the two piece electrode uppermost. In this way the force of gravity maintains the contact at the gap position 19. If it is desired to produce a completely sealed device, as is exemplified by FIG. 1, the composition and pressure of the atmosphere of the soldering oven is controlled to produce the desired atmosphere in the sealed device. The temperature of the oven is raised to the soldering temperature at which the fusible metal is liquid then cooled to ambient temperature. When the metal solidifies during cooling the electrode cap 15 and the support member 14 become fixed with respect to one another. Subsequent shrinkage of the metal parts with respect to the insulating housing 13 results in the opening up of the protective gap 19 between the electrode cap 15 and the opposite electrode 11. This occurs because the coefficients of linear expansion of metals are, typically, greater than the coefficients of linear expansion of insulating materials. If, in the device of FIG. 1, the lower electrode 11 and the electrode cap 15 are made of the same material and the support member 14 is made of a different material, then the gap width is given by the following expression $$G=(l_2c_2+l_3c_3-l_1c_1)(T_2-T_1). \quad (1)$$

In this expression G is the gap width; $l_1$, $l_2$ and $l_3$ are length dimensions indicated in FIG. 1; $c_1$ is the coefficient of linear expansion of the insulating ceramic housing 13; $c_2$ is the coefficient of the linear expansion of the elements 11 and 15; and $c_3$ is the coefficient of linear expansion of the support element 14. $T_2$ is the liquidus temperature of the solder alloy and $T_1$ is the ambient temperature. Equation (1) assumes that the coefficients of expansion are constant with temperature. This is a reasonable approximation for most pure metals. For other materials the product $c_i(T_2-T_1)$ can be gotten from published charts and tables. This product represents the fractional change in length between the two temperatures.

Figure 2:
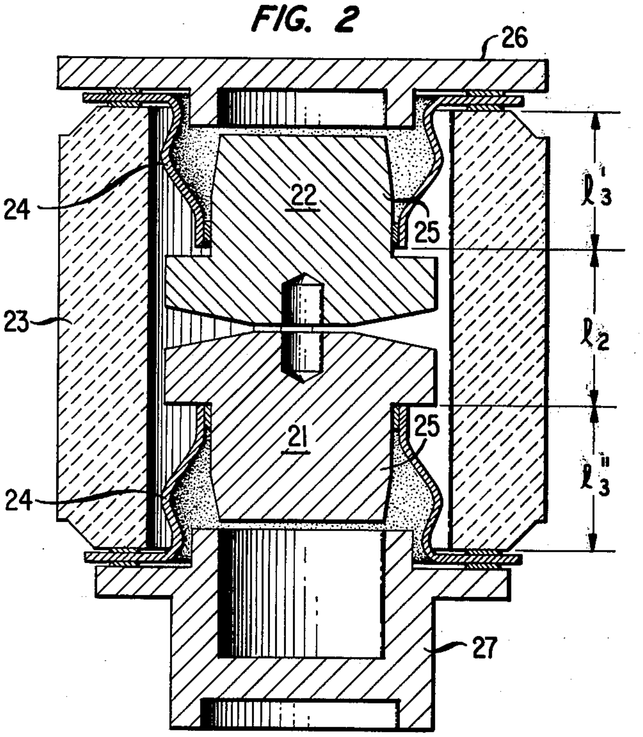
FIG. 2 is an elevational view in section of an exemplary surge protective device with two telescoping electrodes.

FIG. 2 shows a surge protector in which both the lower electrode 21 and the upper electrode 22 include two telescoping piece parts, a flanged sleeve 24 and an electrode cap 25 defining the spark gap between the caps 25. This may be done for the convenience of having to manufacture fewer different codes of piece parts. The metallic end studs 26, 27 are designed to mate with the parts of the device into which the surge protector is to be installed. As in FIG. 1 the electrodes 21, 22 are separated by an insulating housing 23.

Figure 3:
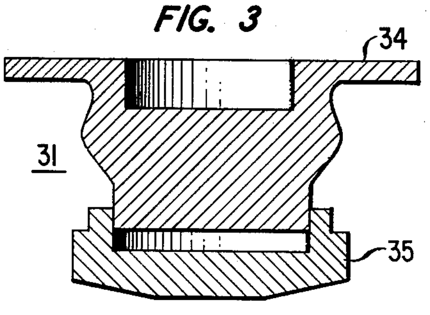
FIG. 3 is an elevational view in section of an exemplary telescoping electrode.

FIG. 3 shows an electrode assembly 31 in which the flanged support member 34 is fabricated from solid stock and fits within a cavity in the electrode cap 35. If the electrode cap and the support member are made of different materials it is desirable that the material with a higher coefficient of linear expansion fit inside of the part with the lower coefficient of linear expansion. If this situation obtains, then as the temperature of the soldering oven is increased the fit between the two elements becomes tighter. This tends to align the elements with respect to one another and produces better contact for soldering. For example, if the electrode cap is made of copper and the support member is made of Kovar, then, as in FIG. 1, the electrode cap 15 should preferably telescope inside of the support member 14. If the support member is copper and the cap is molybdenum then, as in FIG. 3, it would be desirable to design the support member 34 to fit within the electrode cap 35.

The insulator 13, 23 may be made of a ceramic (e.g., high density alumina), a glass (e.g., fused quartz), a crystalline material (e.g., sapphire), or other such material suited to the prospective use environment. It must also be able to withstand the high temperature usually needed to produce sufficient differential thermal contraction for the desired gap width. For this same reason the use of a fusible metal with a solidification temperature of 600 degrees or higher is preferred.

In designing a surge protector of the herein disclosed type the designer must select the gap width and the composition and pressure of the gas within the device to produce the desired protective breakdown voltage. The relationship among these parameters is well known. If, as in the illustrated exemplary devices, the device is to be fabricated in a completely sealed condition, the brazing may be done in an atmosphere controlled oven. In the selection of the atmospheric pressure of the oven consideration, of course, must be given to the linear variation of gas pressure with temperature.

EXAMPLE

In an exemplary device of FIG. 2 the support member, a flanged sleeve, was made of Kovar (an alloy of ~28 percent Ni, 17 percent Co, remainder Fe) whose fractional change of length between 800° C. and room temperature is approximately 0.83 percent. The total length of Kovar parts, $l_3=l_3'+l_3''$, was 2.9±0.1 mm. The electrode caps 25 were made of copper with a fractional length change over the temperature range of approximately 1.65 percent and a total length $l_2$ of 4.2±0.1 mm. A brazing alloy consisting of copper-silver entectic (BT Braze), melting at approximately 800° C., was applied via brazing rings onto appropriate areas of the piece parts. The telescoping parts were designed to have a loose slide fit. The housing 23 was a high alumina ceramic with a fractional length change of approximately 0.6 percent and a length, $l_1$, of 7.6±0.15 mm. They were assembled vertically and placed in a brazing oven with a controlled atmosphere of argon at sufficient pressure to produce an "after cooling" pressure of 1 atmosphere. After brazing and the reduction of the temperature of ambient (approximately 20° C.) the gap width was 0.06±0.01 mm.

What is claimed is:

1. A surge protector comprising a tubular insulating housing and two electrodes defining a spark gap within the housing, the electrodes each being provided with a flange, the flanges each engaging one end of the housing and being affixed thereto characterized in that at least one of the electrodes consists essentially of a metal flanged support member and a metal electrode cap telescopically engaging the support member opposite the flange and soldered thereto by means of a fusible metal alloy, whereby the width of the spark gap between the electrode cap and the opposite electrode is determined by differential contraction of the electrodes relative to the housing during cooling from the brazing temperature to ambient temperature.

2. A device of claim 1 in which each electrode consists essentially of a metal flanged support member and a metal electrode cap and which the spark gap is suited between the electrode caps.

3. A device of claim 1 in which the fusible metal alloy is solid at temperatures below 600° C.

4. A device of claim 3 in which the fusible metal alloy consists primarily of copper and silver.

5. A surge protector comprising a tubular insulating housing and two electrodes defining a spark gap within the housing, the electrodes each being provided with a flange, the flanges each engaging one end of the housing and being affixed thereto characterized in that at least one of the electrodes consists essentially of a metal flanged sleeve and a metal electrode cap telescopically engaging the sleeve opposite the flange and soldered thereto by means of a fusible metal alloy, whereby the width of the spark between the electrode cap and the opposite electrodes gap is determined by differential contraction of the electrodes relative to the housing during cooling from the brazing temperature to ambient temperature.

* * * * *

UNITED STATES PATENT AND TRADEMARK OFFICE

CERTIFICATE OF CORRECTION

PATENT NO. : 4,175,277

DATED : November 20, 1979

INVENTOR(S) : Paul Zuk

It is certified that error appears in the above-identified patent and that said Letters Patent are hereby corrected as shown below:

Column 3, line 30 "within" should read --with--.

Column 6, line 5 "suited" should read --situated--.

Signed and Sealed this

*Twentieth* Day of *May 1980*

[SEAL]

*Attest:*

SIDNEY A. DIAMOND

*Attesting Officer* *Commissioner of Patents and Trademarks*